United States Patent
Gupta et al.

(10) Patent No.: US 10,768,822 B2
(45) Date of Patent: Sep. 8, 2020

(54) INCREASING STORAGE CAPACITY IN HETEROGENEOUS STORAGE ARRAYS

(71) Applicant: International Business Machines Corporation, Armonk, NY (US)

(72) Inventors: Lokesh M. Gupta, Tucson, AZ (US); Karl A. Nielsen, Tucson, AZ (US); Matthew G. Borlick, Tucson, AZ (US); Kevin J. Ash, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/261,076

(22) Filed: Jan. 29, 2019

(65) Prior Publication Data

US 2020/0241762 A1     Jul. 30, 2020

(51) Int. Cl.
*G06F 3/06*     (2006.01)
*G06F 11/07*     (2006.01)

(52) U.S. Cl.
CPC .......... *G06F 3/0608* (2013.01); *G06F 3/0629* (2013.01); *G06F 3/0685* (2013.01); *G06F 3/0689* (2013.01); *G06F 11/0727* (2013.01)

(58) Field of Classification Search
CPC ........................................................ G06F 3/06
See application file for complete search history.

(56) References Cited

U.S. PATENT DOCUMENTS

| | | | |
|---|---|---|---|
| 8,015,439 B2 | 9/2011 | Mukker et al. | |
| 8,041,924 B2 | 10/2011 | Strange et al. | |
| 8,065,481 B1 | 11/2011 | Hiller et al. | |
| 9,513,845 B2 | 12/2016 | Bennett et al. | |
| 9,519,556 B2 | 12/2016 | Joshi et al. | |
| 9,588,856 B2 | 3/2017 | Bartlett et al. | |
| 9,710,345 B2 | 7/2017 | Chhaunker et al. | |
| 2007/0174672 A1* | 7/2007 | Benhase | G06F 3/061 714/6.2 |
| 2008/0126850 A1* | 5/2008 | Kubo | G06F 11/1092 714/6.2 |
| 2011/0296103 A1 | 12/2011 | Igashira et al. | |
| 2013/0086316 A1* | 4/2013 | Shah | G06F 12/0866 711/113 |
| 2018/0018096 A1* | 1/2018 | Fekete | G06F 3/061 |
| 2019/0205053 A1* | 7/2019 | Nomura | G06F 9/5077 |
| 2019/0235781 A1* | 8/2019 | Gong | G06F 3/0619 |

* cited by examiner

*Primary Examiner* — David E Martinez
(74) *Attorney, Agent, or Firm* — Nelson and Nelson; Daniel P. Nelson; Alexis V. Nelson

(57) ABSTRACT

A method for increasing effective storage capacity in a heterogeneous storage array is disclosed. In one embodiment, such a method determines a number of smaller-capacity storage drives and a number of larger-capacity storage drives in a storage array. The method further determines which RAID arrays in the storage array may be composed exclusively of the larger-capacity storage drives. Using this information, the method establishes a first set of RAID arrays in the storage array that will be composed exclusively of the larger-capacity storage drives and a second set of RAID arrays that may contain the smaller-capacity storage drives. The method then initiates a process to swap the smaller-capacity storage drives in the first set with the larger-capacity storage drives in the second set until the first set of RAID arrays is composed exclusively of the larger-capacity storage drives. A corresponding system and computer program product are also disclosed.

20 Claims, 8 Drawing Sheets

INCREASING STORAGE CAPACITY IN HETEROGENEOUS STORAGE ARRAYS

BACKGROUND

Field of the Invention

This invention relates to systems and methods for increasing effective storage capacity in arrays of heterogeneous storage drives.

Background of the Invention

A RAID (i.e., a Redundant Array of Independent Disks) is a storage technology that provides increased storage functions and reliability through redundancy. A RAID is created by combining multiple storage drive components (e.g., disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

In many cases, RAIDs are created from storage drives in a storage array (i.e., a storage system containing multiple storage drives). When users or enterprises purchase storage arrays, the storage arrays are typically equipped with a homogeneous set of storage drives—i.e., a set of storage drives where each storage drive has the same performance and storage capacity. This facilitates combining the storage drives into RAID arrays with little or no wasted storage capacity. However, as the storage capacity of storage drives continues to increase, storage drives in a storage array may be replaced with storage drives of larger storage capacity, thereby creating a heterogeneous set of storage drives with differing capacities. In such systems, as RAID arrays are rebuilt in response to drive failures, RAID arrays may also be made up of storage drives of differing storage capacities. This can lead to wasted or unutilized storage space in some storage drives of the RAID arrays.

In view of the foregoing, what are needed are systems and methods to more optimally utilize storage space in storage arrays made up of heterogeneous storage drives. Ideally, such systems and methods will organize storage drives of a storage array in such a way that RAID arrays will contain, as much as possible, storage drives of substantially equal storage capacity.

SUMMARY

The invention has been developed in response to the present state of the art and, in particular, in response to the problems and needs in the art that have not yet been fully solved by currently available systems and methods. Accordingly, embodiments of the invention have been developed to increase effective storage capacity in a heterogeneous storage array. The features and advantages of the invention will become more fully apparent from the following description and appended claims, or may be learned by practice of the invention as set forth hereinafter.

Consistent with the foregoing, a method for increasing effective storage capacity in a heterogeneous storage array is disclosed. In one embodiment, such a method determines a number of smaller-capacity storage drives and a number of larger-capacity storage drives in a storage array. The method further determines which RAID arrays in the storage array may be composed exclusively of the larger-capacity storage drives. Using this information, the method establishes a first set of RAID arrays in the storage array that will be composed exclusively of the larger-capacity storage drives and a second set of RAID arrays that may contain the smaller-capacity storage drives. The method then initiates a process to swap the smaller-capacity storage drives in the first set with the larger-capacity storage drives in the second set until the first set of RAID arrays is composed exclusively of the larger-capacity storage drives.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
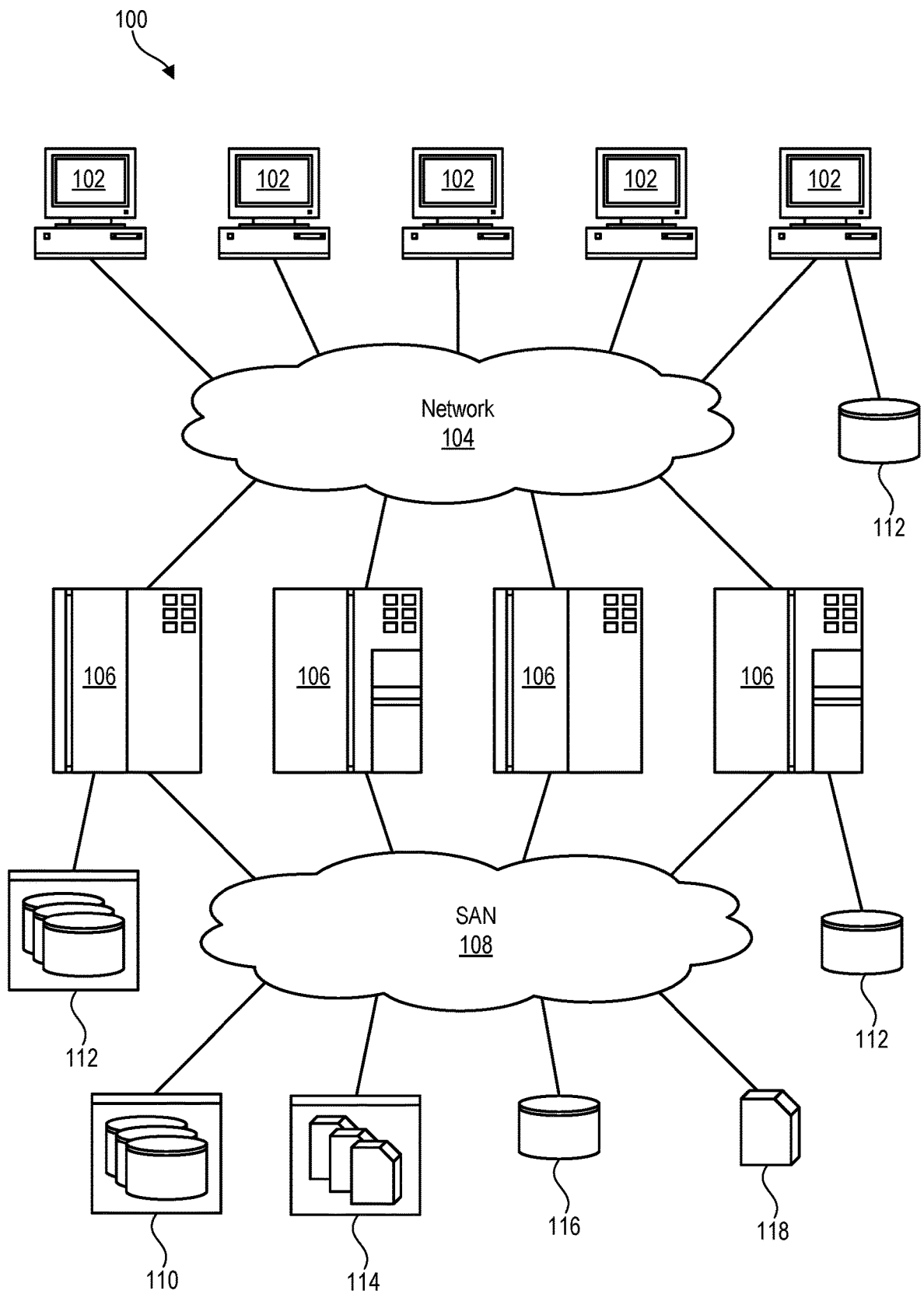
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
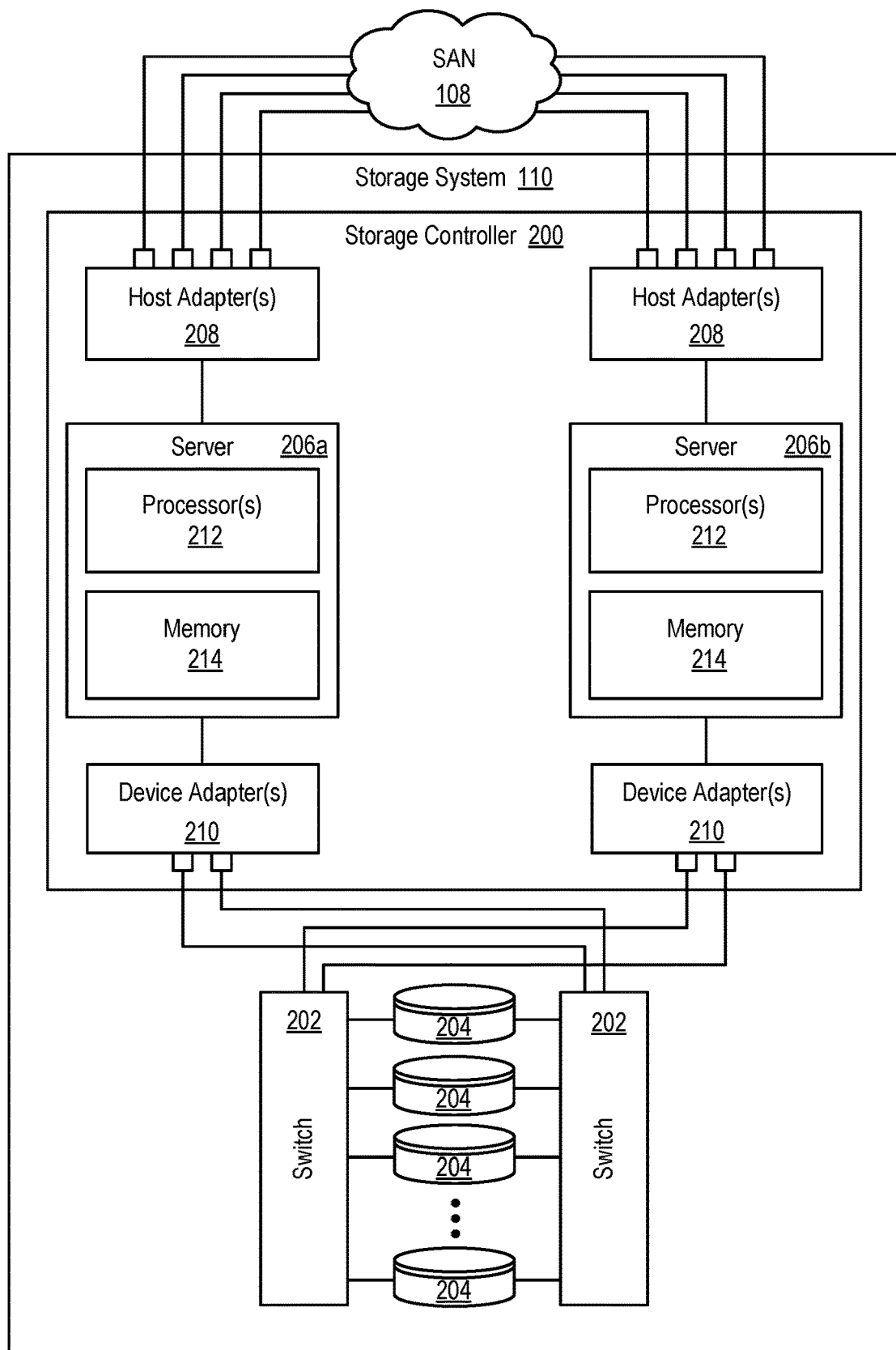
FIG. 2 is a high-level block diagram showing one embodiment of a storage system that hosts multiple storage drives.

Referring to FIG. 2, one example of a storage system 110 containing an array of hard-disk drives 204 and/or solid-state drives 204 is illustrated. The internal components of the storage system 110 are shown since a RAID may, in certain embodiments, be implemented all or partly within such a storage system 110. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
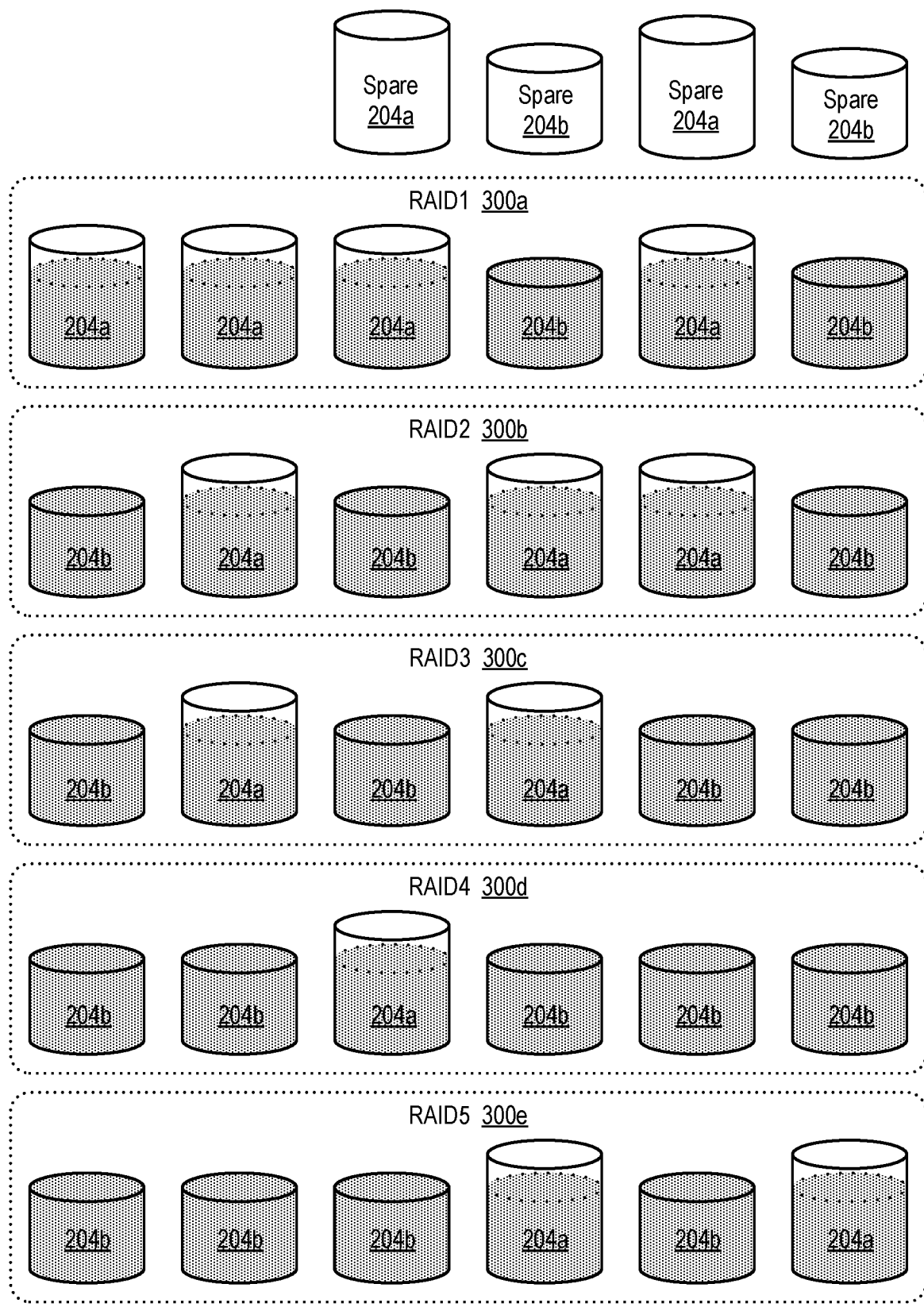
FIG. 3 is a high-level block diagram showing a storage array comprising RAID arrays composed of both smaller-capacity storage drives and larger-capacity storage drives.

Referring to FIG. 3, in certain embodiments, RAIDs may be created from storage drives 204 in a storage array 110 (i.e., a storage system 110 comprising multiple storage drives 204, such as that illustrated in FIG. 2). When users or enterprises purchase storage arrays 110, the storage arrays 110 are typically equipped with a homogeneous set of storage drives 204—i.e., a set of storage drives 204 where each storage drive 204 has the same performance and storage capacity. This facilitates combining the storage drives 204 into RAID arrays 300 with little or no wasted storage capacity. However, as the storage capacity of storage drives continues to increase, storage drives 204 in a storage array 110 may be replaced with storage drives 204 of larger capacity, thereby creating a heterogeneous set of storage drives 204 with differing storage capacities. In some cases, as storage drives 204 are replaced or added to a storage array 110 as spares, a RAID array 300 may be made up of storage drives 204 of differing storage capacities. This can lead to wasted or unutilized storage space in some storage drives 204 of the RAID array 300.

Thus, systems and methods are needed to more optimally utilize storage space in storage arrays 110 made up of heterogeneous storage drives 204. Ideally, such systems and methods will organize storage drives 204 of a storage array 110 in such a way that RAID arrays 300 will contain, as much as possible, storage drives 204 of substantially equal storage capacity.

FIG. 3 shows an array 110 of storage drives 204 made up of smaller-capacity storage drives 204b (e.g., 900 gigabyte storage drives 204b) and larger-capacity storage drives 204a (e.g., 1.2 terabyte storage drives 204a). As shown, the smaller-capacity storage drives 204b and larger-capacity storage drives 204a are configured in multiple RAID arrays 300a-e. In this example, the RAID arrays 300 contain six storage drives 204 each (e.g., a RAID 5 configuration with 5+p storage drives 204), although this may vary in different embodiments. As shown, each of the RAID arrays 300 includes at least one smaller-capacity storage drive 204b and at least one larger-capacity storage drive 204a. This may be the result of the RAID arrays 300 being rebuilt with larger-capacity storage drives 204a as storage drives 204 in the RAID arrays 300 fail. In this example, spare storage drives 204 of both the smaller capacity and larger capacity are also provided in the event a storage drive 204 fails in any of the RAID arrays 300a-e and a spare storage drive 204 is needed to rebuild a RAID array 300.

As further shown in FIG. 3, because each RAID array 300 is composed of both smaller-capacity storage drives 204b and larger-capacity storage drives 204a, the effective storage capacity of each RAID array 300 may be limited by the storage capacity of the smaller-capacity storage drive 204b. The shaded portion of each storage drive 204 indicates the amount of storage capacity that may be utilized on each storage drive 204 in each RAID array 300. As shown, each larger-capacity storage drive 204a includes an amount of unutilized storage capacity since it is grouped with smaller-capacity storage drives 204b. On the other hand, a RAID array 300 that is constructed exclusively of the larger-capacity storage drives 204a may utilize all or substantially all storage capacity of the larger-capacity storage drives 204a, thereby increasing the effective storage capacity of the RAID array 300.

In order to increase the effective storage capacity of a set of heterogeneous storage drives 204, such as those illustrated in FIG. 3, systems and methods in accordance with the invention may attempt to organize storage drives 204 of the storage array 110 in such a way that RAID arrays 300 contain, as much as possible, storage drives 204 of substantially equal storage capacity. In order to accomplish this, such systems and methods may initially determine how many RAID arrays 300 may be constructed exclusively of the larger-capacity storage drives 204a. In the illustrated example shown in FIG. 3, the storage array 110 includes twelve larger-capacity storage drives 204a, not counting spares. Because the RAID arrays 300 each contain six storage drives 204, two RAID arrays 300 may be constructed exclusively of larger-capacity storage drives 204a while leaving two spare storage drives 204a of larger storage capacity.

In order to create two RAID arrays 300 composed exclusively of larger-capacity storage drives 204a, systems and methods in accordance with the invention may swap data in selected storage drives 204 of the storage array 110. In certain embodiments, RAID arrays 300 already containing the most larger-capacity storage drives 204a may be selected to contain all larger-capacity storage drives 204a. In the illustrated example, the RAID arrays 300a, 300b contain the most larger-capacity storage drives 204a. Thus, the smaller-capacity storage drives 204b in these RAID arrays 300a, 300b may be swapped with larger-capacity storage drives 204a so that these RAID arrays 300a, 300b contain exclusively larger-capacity storage drives 204a.

Figure 4:
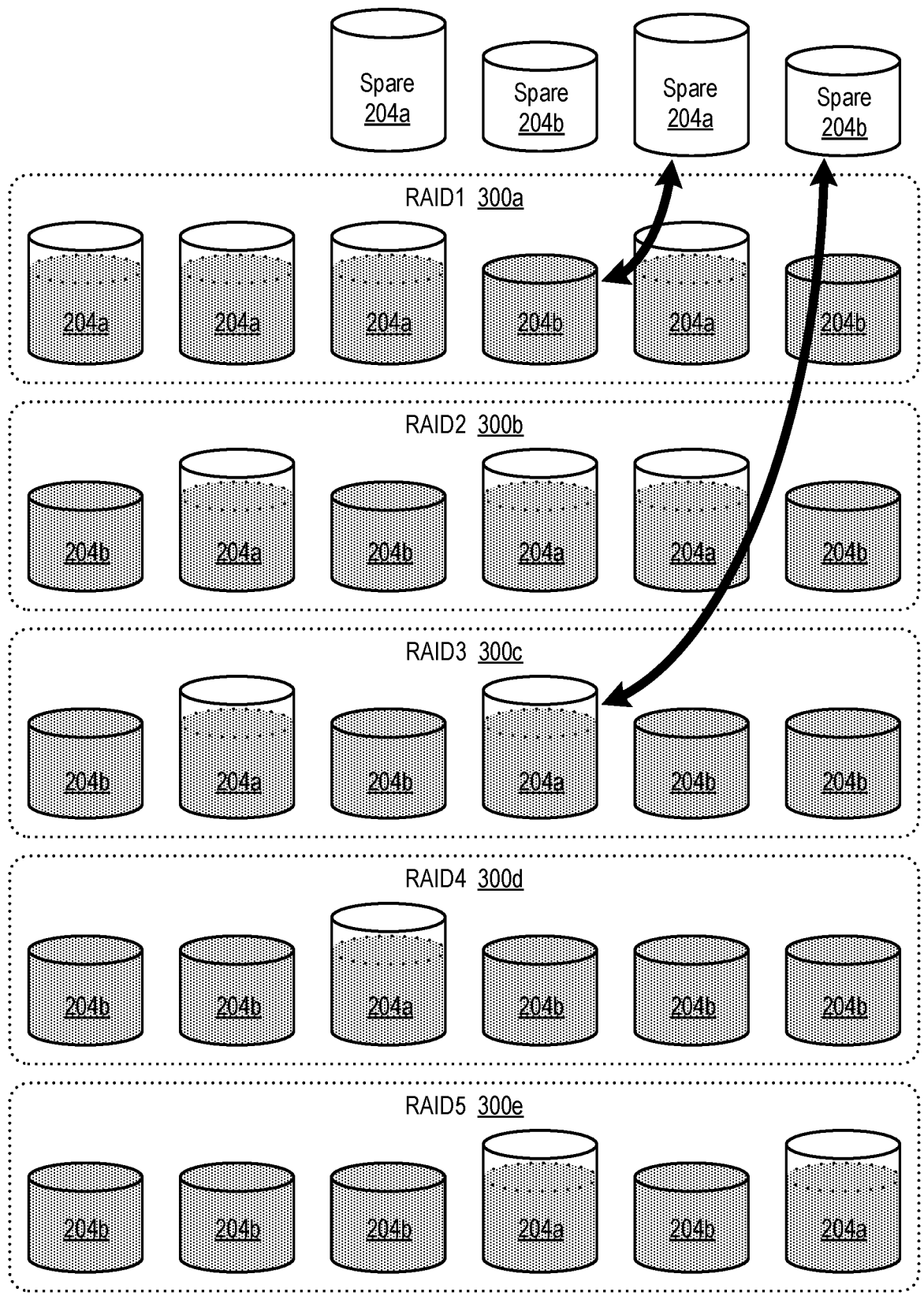
FIG. 4 is a high-level block diagram showing swapping of smaller-capacity storage drives with larger-capacity storage drives and vice versa.
Figure 5:
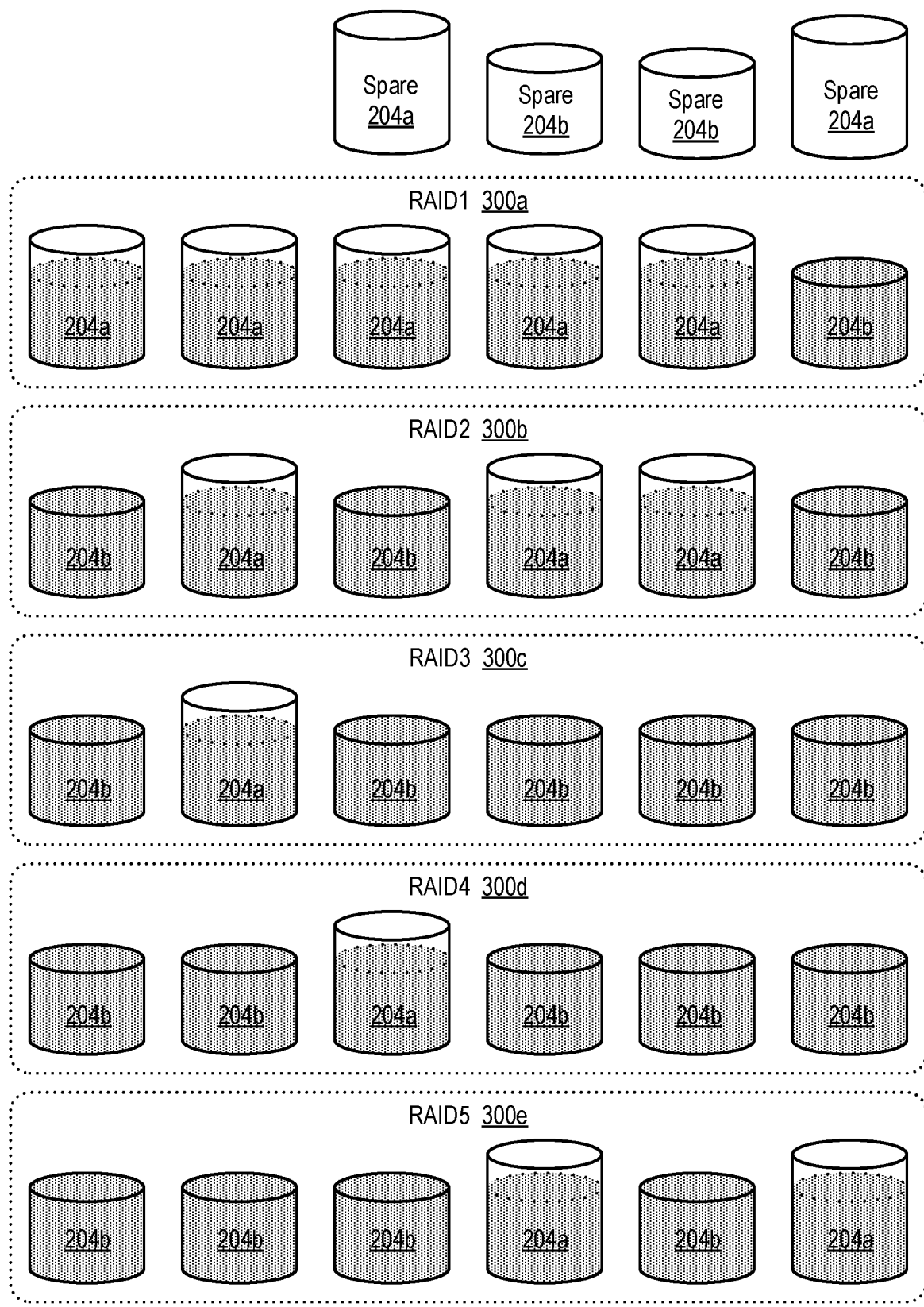
FIG. 5 is a high-level block diagram showing RAID arrays after the swap illustrated in FIG. 4.

Referring to FIGS. 4 and 5, in order to accomplish the above-described reorganization, larger-capacity storage drives 204a may be swapped out of the RAID arrays 300c-e. This may be accomplished by copying data from the larger-capacity storage drives 204a to smaller-capacity storage drives 204b, such as spare smaller-capacity storage drives 204b, and then incorporating the smaller-capacity storage drives 204b into the RAID arrays 300c-e. This will free larger-capacity storage drives 204a so they can be swapped into the RAID arrays 300a, 300b. FIG. 4 is a high-level block diagram showing swapping of smaller-capacity storage drives 204b with larger-capacity storage drives 204a. FIG. 5 is a high-level block diagram showing the RAID arrays 300a-e after execution of the swaps illustrated in FIG. 4.

Figure 6:
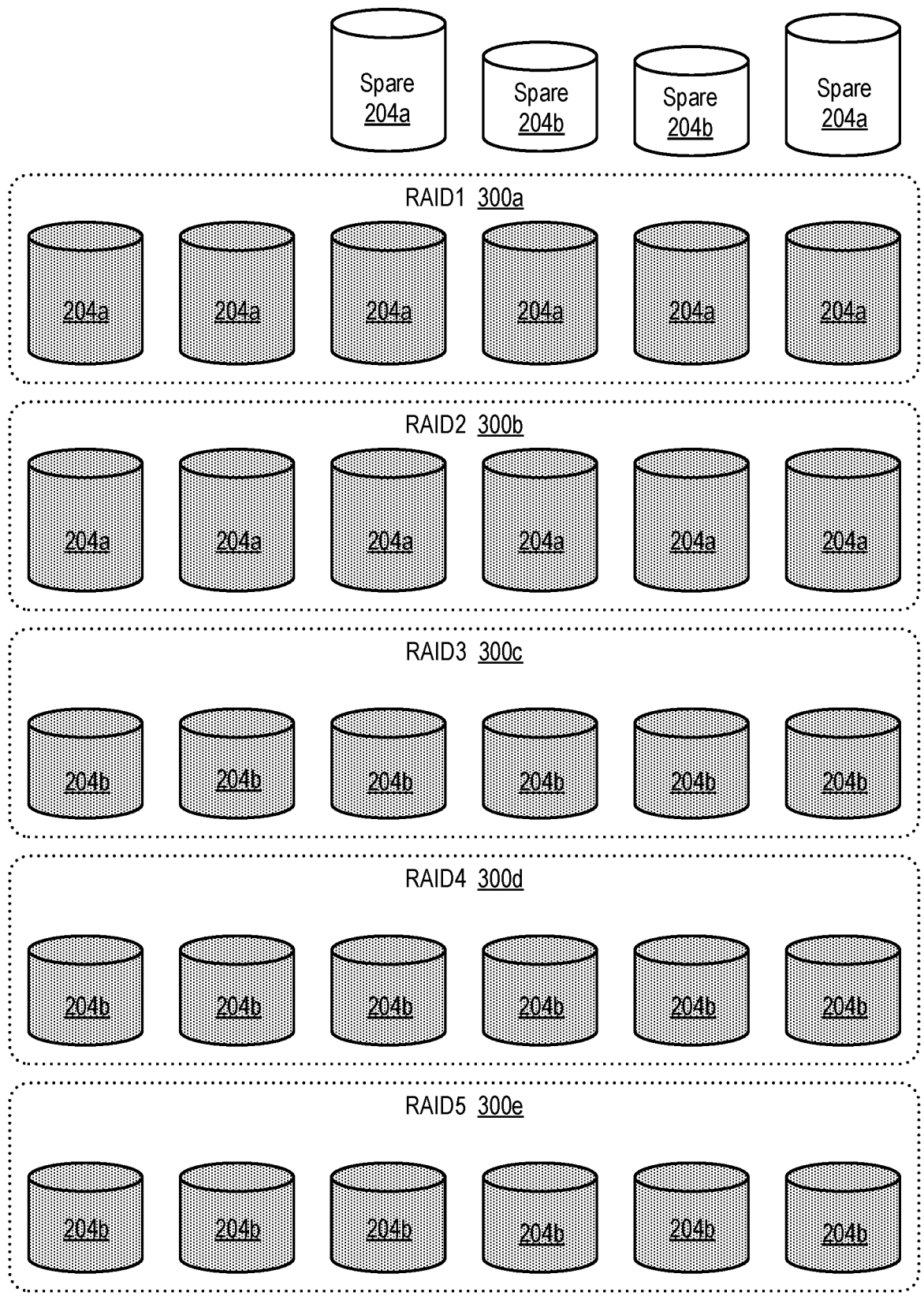
FIG. 6 is a high-level block diagram showing the RAID arrays after all swaps are complete.

Because the storage array 110 may contain only so many spare storage drives 204, swapping may occur in an alternating manner. That is, one larger-capacity storage drive 204a may be swapped out of a RAID array 300 and replaced with a spare smaller-capacity storage drive 204b, and then the larger-capacity storage drive 204a may be swapped into a RAID array 300 to generate a new spare smaller-capacity storage drive 204b. This process may be repeated until all RAID arrays 300a, 300b identified to contain only larger-capacity storage drives 204a, are composed exclusively of larger-capacity storage drives 204a, as shown in FIG. 6.

In certain embodiments, a smart rebuild process may be used to swap data between larger-capacity storage drives 204a and smaller-capacity storage drives 204b. This smart rebuild process may reduce exposure to data loss by maintaining the ability for a storage drive 204 to be used as a spare even as data is being copied to it during a swap. In certain embodiments, when data is being copied from an old storage drive 204 to a new storage drive 204, the smart rebuild process may create a bitmap for the old storage drive 204. Each bit may represent a section (e.g., a one megabyte region) of storage space on the old storage drive 204. The smart rebuild process may then begin copying data from the old storage drive 204 to the new storage drive 204. As each section is copied, its associated bit may be recorded in the bitmap.

If a write is received to a section of the old storage drive 204 while the data copy process is ongoing, the smart rebuild process may check the bitmap to determine if data in the associated section has already been copied to the new storage drive 204. If not, the smart rebuild process may simply write the data to the corresponding section of the old storage drive 204. Otherwise, after writing the data to the old storage drive 204, the data may also be copied to the new storage drive 204. Once all sections are copied from the old storage drive 204 to the new storage drive 204, the RAID array 300 may begin to use the new storage drive 204 in place of the old storage drive 204. This frees the old storage drive 204 from the RAID array 300.

Alternatively, the smart rebuild process may utilize a watermark instead of a bitmap to track which data has been copied from an old storage drive 204 to a new storage drive 204. In such an embodiment, sections may be copied in a designated order from an old storage drive 204 to a new storage drive 204. The watermark may track how far the copy process has progressed through the sections. If a write is received to a section of the old storage drive 204 during the copy process, the smart rebuild process may check the watermark to determine if data in the section has already been copied to the new storage drive 204. If not, the smart rebuild process may write the data to the old storage drive 204. Otherwise, after writing the data to the old storage drive 204, the smart rebuild process may also copy the data to the new storage drive 204. Once all sections have been copied from the old storage drive 204 to the new storage drive 204, the RAID array 300 may begin to use the new storage drive 204 in place of the old storage drive 204. This frees the old storage drive 204 from the RAID array 300.

Figure 7:
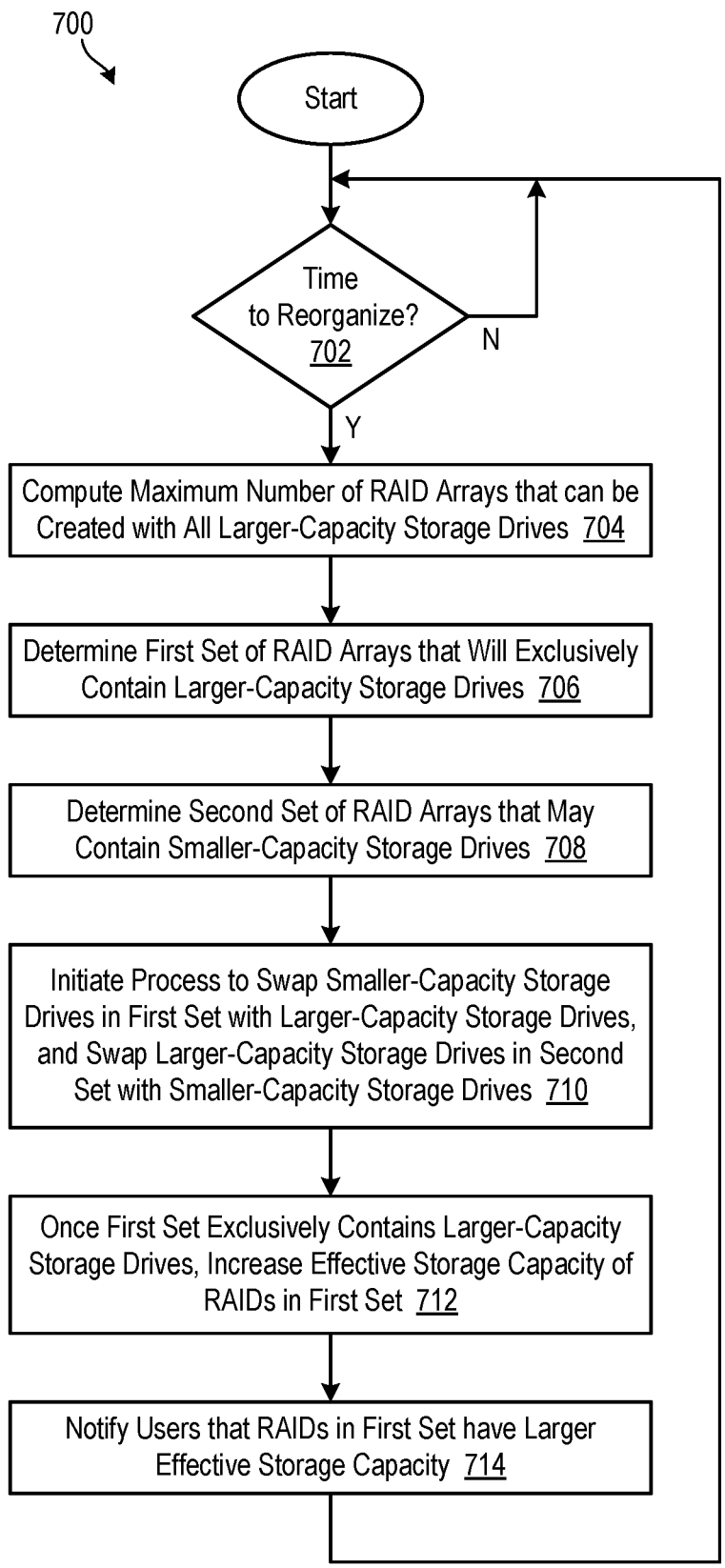
FIGS. 7 and 8 are flow diagrams showing one embodiment of a method for increasing effective storage capacity in a heterogeneous storage array

Referring to FIG. 7, one embodiment of a method 700 for increasing effective storage capacity in a heterogeneous storage array 110 is illustrated. As shown, the method 700 initially determines 702 whether it is time to reorganize storage drives 204 within a storage array 110 to increase effective storage capacity. In certain embodiments, the storage array 110 is reorganized periodically (e.g., once a week). In other embodiments, the storage array 110 is reorganized in response to an event, such as the addition of a new spare storage drive 204 into the storage array 110, the failure of a storage drive 204 in the storage array 110, or the like.

If, at step 702, the method 700 determines that it is time to reorganize the storage array 110, the method 700 computes a maximum number of RAID arrays 300 that may be created using all larger-capacity storage drives 204a. In certain embodiments, this is accomplished by determining how many larger-capacity storage drives 204a are utilized in the storage array 110, and dividing this number by how many storage drives 204 are utilized in each RAID array 300. If different types of RAID arrays 300 are used in the storage array 110, such as RAID arrays 300 that include different numbers of storage drives 204, the method 700 may compute 704 the maximum number for each type of RAID array 300 that exists in the storage array 110.

Using the information obtained at step 704, the method 700 determines 706 a a first set of RAID arrays 300 that will be composed exclusively of larger-capacity storage drives 204a, and determines 708 a second set of RAID arrays 300 that may contain smaller-capacity storage drives 204b. If the storage array 110 contains RAID arrays 300 of different types (i.e., RAID arrays 300 that utilize different numbers of storage drives 204), the method 700 may mix and match different types of RAID arrays 300 to most efficiently utilize the larger-capacity storage drives 204a. For example, the method 700 may utilize three RAID arrays 300 of six storage drives 204 each, and a single RAID array 300 of seven storage drives 204, to utilize a total of twenty-five larger-capacity storage drives 204a in a storage array 110, not counting spares.

Figure 8:
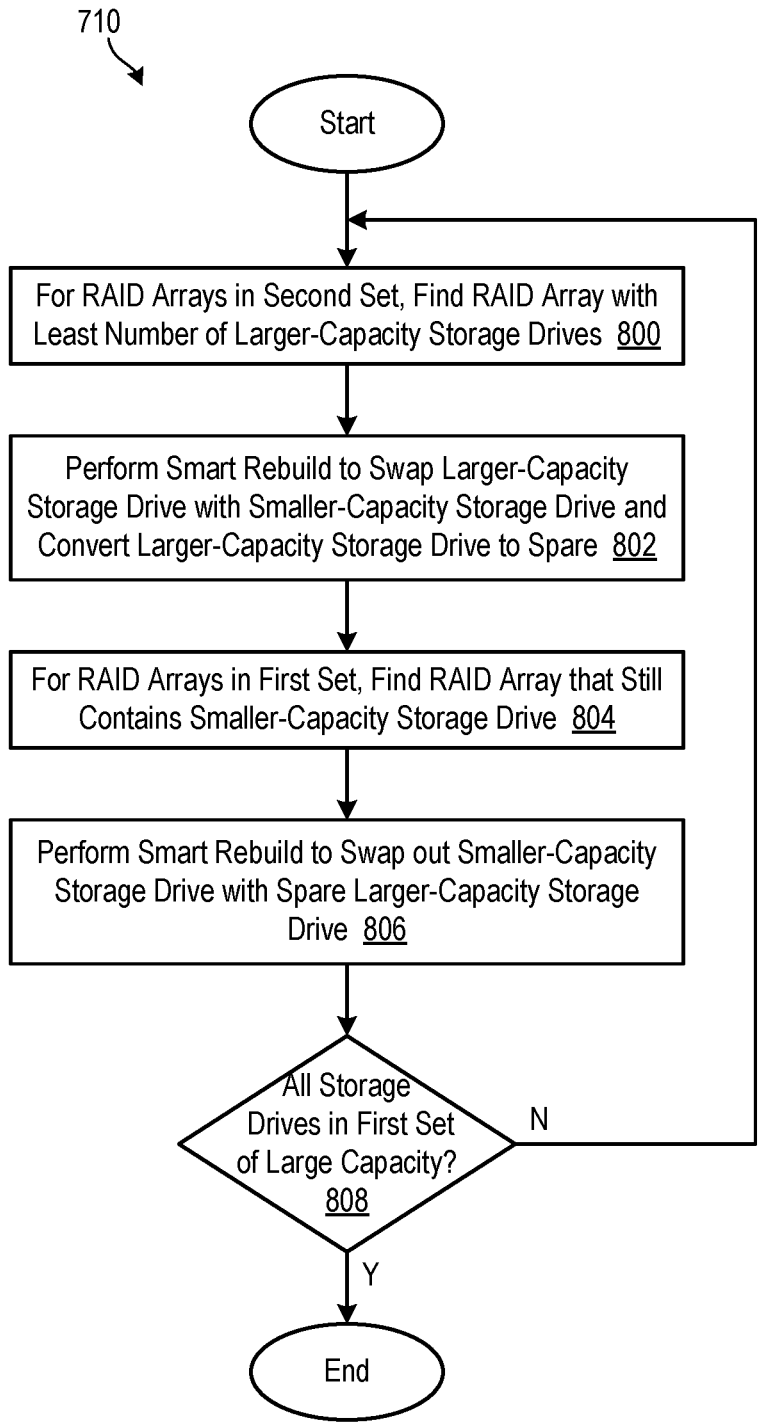

Once the first and second sets of RAID arrays 300 are determined 706, 708, the method 700 initiates 710 a process to swap smaller-capacity storage drives 204b in the first set with larger-capacity storage drives 204a, and swap larger-capacity storage drive 204a in the second set with smaller-capacity storage drives 204b. One embodiment of this process 710 is shown in FIG. 8. As shown in FIG. 8, for RAID arrays 300 in the second set, the process 710 finds 800 the RAID array 300 with the least number of larger-capacity storage drives 204a. The process 710 then performs 802 a smart rebuild to copy data from the larger-capacity storage drive 204a to a spare smaller-capacity storage drive 204b and converts 802 the larger-capacity storage drive 204a to a spare. The process 710 then finds 804 a RAID array 300 in the first set that still contains at least one smaller-capacity storage drive 204b. The process 710 then performs 806 a smart rebuild to swap the smaller-capacity storage drive 204b with a spare larger-capacity storage drive 204a (such as the spare larger-capacity storage drive 204a created at step 802). As indicated at decision step 808, this process 710 continues until all RAID arrays 300 in the first set are composed exclusively of larger-capacity storage drives 204a.

Referring again to FIG. 7, once the RAID arrays 300 in the first set are composed exclusively of larger-capacity storage drives 204a, the method 700 may increase 712 the effective storage capacity of these RAID arrays 300. As previously described, these RAID arrays 300 may now utilize all or most storage capacity in the larger-capacity storage drives 204a, thereby enabling the effective storage capacity of the RAID arrays 300 to be increased. Once the effective storage capacity of the RAID arrays 300 is increased, the method 700 may notify 714 users of the RAID arrays 300 that more storage capacity is available in the RAID arrays 300. In certain embodiments, these users may choose to pay for the increased storage capacity.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for increasing effective storage capacity in a heterogeneous storage array, the method comprising:
   determining a number of larger-capacity storage drives that are utilized in a storage array, the storage array containing the larger-capacity storage drives and a quantity of smaller-capacity storage drives;
   taking into account the number, determining which RAID arrays in the storage array may be composed exclusively of the larger-capacity storage drives;
   establishing a first set of RAID arrays in the storage array that will be composed exclusively of the larger-capacity storage drives and a second set of RAID arrays that may contain the smaller-capacity storage drives; and
   initiating a process to swap the smaller-capacity storage drives in the first set with the larger-capacity storage drives in the second set until the first set of RAID arrays is composed exclusively of the larger-capacity storage drives.

2. The method of claim 1, wherein initiating the process comprises initiating the process at designated intervals.

3. The method of claim 1, wherein initiating the process comprises initiating the process when new storage drives are added to the storage array.

4. The method of claim 1, wherein initiating the process comprises initiating the process when a storage drive in the storage array fails.

5. The method of claim 1, wherein determining which RAID arrays in the storage array may be composed exclusively of the larger-capacity storage drives comprises taking into account the number of larger-capacity storage drives in the storage array and a number of storage drives that are contained in each of the RAID arrays.

6. The method of claim 1, further comprising increasing an effective storage capacity of a particular RAID array in the storage array once it is composed exclusively of the larger-capacity storage drives.

7. The method of claim 6, further comprising notifying a user that the effective storage capacity of the particular RAID array has increased.

8. A computer program product for increasing effective storage capacity in a heterogeneous storage array, the computer program product comprising a computer-readable medium having computer-usable program code embodied therein, the computer-usable program code configured to perform the following when executed by at least one processor:
   determine a number of larger-capacity storage drives that are utilized in a storage array, the storage array containing the larger-capacity storage drives and a quantity of smaller-capacity storage drives;
   taking into account the number, determine which RAID arrays in the storage array may be composed exclusively of the larger-capacity storage drives;
   establish a first set of RAID arrays in the storage array that will be composed exclusively of the larger-capacity storage drives and a second set of RAID arrays that may contain the smaller-capacity storage drives; and
   initiate a process to swap the smaller-capacity storage drives in the first set with the larger-capacity storage drives in the second set until the first set of RAID arrays is composed exclusively of the larger-capacity storage drives.

9. The computer program product of claim 8, wherein initiating the process comprises initiating the process at designated intervals.

10. The computer program product of claim 8, wherein initiating the process comprises initiating the process when new storage drives are added to the storage array.

11. The computer program product of claim 8, wherein initiating the process comprises initiating the process when a storage drive in the storage array fails.

12. The computer program product of claim 8, wherein determining which RAID arrays in the storage array may be composed exclusively of the larger-capacity storage drives comprises taking into account the number of larger-capacity storage drives in the storage array and a number of storage drives that are contained in each of the RAID arrays.

13. The computer program product of claim 8, wherein the computer-usable program code is further configured to increase an effective storage capacity of a particular RAID array in the storage array once it is composed exclusively of the larger-capacity storage drives.

14. The computer program product of claim 13, wherein the computer-usable program code is further configured to notify a user that the effective storage capacity of the particular RAID array has increased.

15. A system for increasing effective storage capacity in a heterogeneous storage array, the system comprising:
at least one processor;
at least one memory device coupled to the at least one processor and storing instructions for execution on the at least one processor, the instructions causing the at least one processor to:
determine a number of larger-capacity storage drives that are utilized in a storage array, the storage array containing the larger-capacity storage drives and a quantity of smaller-capacity storage drives;
taking into account the number, determine which RAID arrays in the storage array may be composed exclusively of the larger-capacity storage drives;
establish a first set of RAID arrays in the storage array that will be composed exclusively of the larger-capacity storage drives and a second set of RAID arrays that may contain the smaller-capacity storage drives; and
initiate a process to swap the smaller-capacity storage drives in the first set with the larger-capacity storage drives in the second set until the first set of RAID arrays is composed exclusively of the larger-capacity storage drives.

16. The system of claim 15, wherein initiating the process comprises initiating the process at designated intervals.

17. The system of claim 15, wherein initiating the process comprises initiating the process when new storage drives are added to the storage array.

18. The system of claim 15, wherein initiating the process comprises initiating the process when a storage drive in the storage array fails.

19. The system of claim 15, wherein determining which RAID arrays in the storage array may be composed exclusively of the larger-capacity storage drives comprises taking into account the number of larger-capacity storage drives in the storage array and a number of storage drives that are contained in each of the RAID arrays.

20. The system of claim 15, wherein the instructions further cause the at least one processor to increase an effective storage capacity of a particular RAID array in the storage array once it is composed exclusively of the larger-capacity storage drives.

* * * * *